(12) United States Patent
Zou et al.

(10) Patent No.: US 10,397,211 B2
(45) Date of Patent: Aug. 27, 2019

(54) SPLIT AUTHENTICATION NETWORK SYSTEMS AND METHODS

(71) Applicant: Aerohive Networks, Inc., Milpitas, CA (US)

(72) Inventors: Xu Zou, San Jose, CA (US); Kenshin Sakura, San Francisco, CA (US); Mingliang Li, Sunnyvale, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

(21) Appl. No.: 15/922,019

(22) Filed: Mar. 15, 2018

(65) Prior Publication Data
US 2018/0205717 A1     Jul. 19, 2018

Related U.S. Application Data

(63) Continuation of application No. 14/027,188, filed on Sep. 14, 2013, now Pat. No. 9,948,626.

(60) Provisional application No. 61/799,909, filed on Mar. 15, 2013.

(51) Int. Cl.
    *H04L 29/06* (2006.01)
(52) U.S. Cl.
    CPC .......... *H04L 63/08* (2013.01); *H04L 63/0876* (2013.01); *H04L 63/205* (2013.01)
(58) Field of Classification Search
    CPC . H04L 63/0876; H04L 63/0892; H04L 63/10; H04L 63/205; H04W 48/16; G06F 21/44
    See application file for complete search history.

(56) References Cited

U.S. PATENT DOCUMENTS

| | | |
|---|---|---|
| 6,292,792 B1 | 9/2001 | Baffes |
| 6,694,447 B1 | 2/2004 | Leach |
| 7,057,566 B2 | 6/2006 | Theobold |
| (Continued) | | |

OTHER PUBLICATIONS

Aerohive Networks, Inc., "Cooperative Control Wireless LAN Architecture," white paper, 2012 [retrieved from https://media.aerohive.com/documents/524245518_Aerohive-Whitepaper-Cooperative_Control_Wireless_LAN_Architecture.pdf on Nov. 1, 2017].

(Continued)

*Primary Examiner* — Michael Pyzocha
*Assistant Examiner* — Paul E Callahan
(74) *Attorney, Agent, or Firm* — Ahmann Kloke LLP

(57) ABSTRACT

Disclosed is a system comprising: an authentication datastore; a device presence engine; a traffic monitor engine; an authentication presence monitor engine; an authentication server selection engine; and a traffic routing engine. In operation: the device presence engine is configured to detect presence of a user device on a trusted network; the traffic monitor engine is configured to monitor, in response to the detection, traffic on the trusted network from the device; the authentication presence monitor engine is configured to evaluate onboarding characteristics of the user device in response to the monitoring; the authentication server selection engine is configured to select one of a plurality of authentication servers to authenticate the user device to the trusted network, the selecting based on the onboarding characteristics; and the traffic routing engine is configured to route traffic from the user device to the selected authentication server.

20 Claims, 8 Drawing Sheets

(56) References Cited

U.S. PATENT DOCUMENTS

| | | |
|---|---|---|
| 7,085,224 B1 | 8/2006 | Oran |
| 7,099,654 B1 | 8/2006 | Tewfik |
| 7,164,667 B2 | 1/2007 | Rayment |
| 7,181,530 B1 | 2/2007 | Halasz |
| 7,251,238 B2 | 7/2007 | Joshi |
| 7,409,588 B2 | 8/2008 | Yako |
| 7,681,230 B2 | 3/2010 | O'Brien |
| 8,140,888 B1 | 3/2012 | Dhingra |
| 8,174,966 B2 | 5/2012 | Taniguchi |
| 8,321,793 B1 | 11/2012 | Cotter |
| 8,392,712 B1 | 3/2013 | Wilson |
| 8,484,353 B1 | 7/2013 | Johnson |
| 8,560,646 B1 | 10/2013 | Sivasubramanian |
| 8,869,235 B2 | 10/2014 | Qureshi |
| 8,893,255 B1 | 11/2014 | Martini |
| 9,032,506 B2 | 5/2015 | Parla |
| 9,152,782 B2 | 10/2015 | Lin |
| 9,319,272 B1 | 4/2016 | Brandwine |
| 9,723,487 B2 | 8/2017 | Ramalingam |
| 2002/0129146 A1 | 9/2002 | Aronoff |
| 2002/0133746 A1 | 9/2002 | Chen |
| 2003/0126240 A1 | 7/2003 | Vosseler |
| 2003/0208572 A1 | 11/2003 | Shah |
| 2004/0003285 A1 | 1/2004 | Whelan |
| 2004/0236666 A1 | 11/2004 | Clark |
| 2005/0055570 A1 | 3/2005 | Kwan |
| 2005/0086255 A1 | 4/2005 | Schran |
| 2006/0026289 A1 | 2/2006 | Lyndersay |
| 2006/0041939 A1* | 2/2006 | Schwartzman ..... H04L 63/0272 726/15 |
| 2006/0154645 A1* | 7/2006 | Valkenburg ......... H04L 63/0853 455/411 |
| 2006/0179475 A1* | 8/2006 | Zhang .................... H04L 63/08 726/3 |
| 2007/0078663 A1 | 4/2007 | Grace |
| 2007/0140191 A1 | 6/2007 | Kojima |
| 2007/0150603 A1 | 6/2007 | Crull |
| 2007/0198713 A1 | 8/2007 | Tsao |
| 2008/0003994 A1 | 1/2008 | Skinner |
| 2008/0077791 A1 | 3/2008 | Lund |
| 2008/0126845 A1 | 5/2008 | Luo |
| 2008/0178182 A1 | 7/2008 | Yamashima |
| 2008/0244579 A1 | 10/2008 | Muller |
| 2009/0019182 A1 | 1/2009 | Riise |
| 2009/0059874 A1 | 3/2009 | Carter |
| 2009/0327484 A1 | 12/2009 | Chen |
| 2010/0002700 A1 | 1/2010 | Simpson, Jr. |
| 2010/0095359 A1 | 4/2010 | Gordon |
| 2010/0112540 A1 | 5/2010 | Gross |
| 2010/0138899 A1 | 6/2010 | Yamamoto |
| 2010/0142535 A1 | 6/2010 | Swainston |
| 2010/0257399 A1 | 10/2010 | Brown |
| 2010/0287263 A1 | 11/2010 | Liu |
| 2010/0325259 A1 | 12/2010 | Schuler |
| 2011/0040867 A1 | 2/2011 | Kalbag |
| 2011/0067084 A1 | 3/2011 | Byun |
| 2011/0072507 A1 | 3/2011 | Johnston, II |
| 2011/0148743 A1 | 6/2011 | Kuo |
| 2012/0144464 A1 | 6/2012 | Fakhrai |
| 2012/0151248 A1 | 6/2012 | Bower, III |
| 2012/0159531 A1 | 6/2012 | O'Callaghan |
| 2012/0192161 A1 | 7/2012 | Pistoia |
| 2012/0303999 A1 | 11/2012 | Calder |
| 2013/0117848 A1 | 5/2013 | Golshan |
| 2013/0132763 A1 | 5/2013 | Agarwal |
| 2013/0254831 A1 | 9/2013 | Roach |
| 2013/0254889 A1 | 9/2013 | Stuntebeck |
| 2014/0031075 A1 | 1/2014 | Ramiah |
| 2014/0092884 A1 | 4/2014 | Murphy |
| 2014/0101439 A1 | 4/2014 | Pettigrew |
| 2014/0122674 A1 | 5/2014 | Gray |
| 2014/0156841 A1 | 6/2014 | Fu |
| 2014/0177639 A1 | 6/2014 | Vershkov |
| 2014/0196129 A1 | 7/2014 | Amin |
| 2014/0211308 A1 | 7/2014 | Shin |
| 2014/0241316 A1* | 8/2014 | Okmyanskiy ..... H04W 36/0066 370/331 |
| 2014/0258231 A1 | 9/2014 | Birk |
| 2014/0280967 A1 | 9/2014 | Bao |
| 2014/0281672 A1 | 9/2014 | Fu |
| 2014/0282902 A1 | 9/2014 | Zou |
| 2014/0282916 A1 | 9/2014 | Gast |
| 2014/0304808 A1 | 10/2014 | Martini |
| 2014/0330944 A1 | 11/2014 | Dabbiere |
| 2014/0351370 A1 | 11/2014 | Ashley |
| 2015/0052587 A1 | 2/2015 | O'Neill |
| 2015/0324595 A1 | 11/2015 | Strand |
| 2016/0029155 A1 | 1/2016 | Kerr |
| 2016/0112415 A1 | 4/2016 | Park |
| 2016/0182471 A1 | 6/2016 | Wilson |

OTHER PUBLICATIONS

Chen, Minder et al., "Providing Web Services to Mobile Users: The Architecture Design of an m-Service Portal," International Journal of Mobile Communications, vol. 3, No. 1, pp. 1-18, May 2005.

Chung, Sean et al., "2TAC: Distributed Access Control Architecture for 'Bring Your Own Device' Security," 2012 ASE/IEEE International Conference on BioMedical Computing (BioMedCom), pp. 123-126, Dec. 2012.

Cisco Systems, Inc., "Cisco TrustSec™ 2.0: Design and Implementation Guide," Document Version 2.0, Nov. 29, 2011.

Cisco Systems, Inc., "TrustSec How-To Guide: On-boarding and Provisioning," Document Version 3.0, Aug. 27, 2012.

Clausen, T., et al., "Optimized Link State Routing Protocol (OLSR)," Network Working Group, pp. 1-71, Oct. 2003.

Kindberg, Tim et al., "People, Places, Things: Web Presence for the Real World," Mobile Networks and Applications, vol. 7, No. 5, pp. 365-376, Oct. 2002.

Korpipaa, Panu et al., "Managing Context Information in Mobile Devices," IEEE Pervasive Computing, vol. 2., No. 3, pp. 42-51, Jul. 2003.

Perkins, C., et al., "Ad hoc On-Demand Distance Vector (AODV) Routing," Network Working Group, pp. 1-35, Oct. 2003.

Wikimedia Foundation, Inc., "Wireless Access Point," Mar. 13, 2013 [retrieved online at https://en.wikipedia.org/w/index.php?title=Wireless_access_point&oldid=543883036 on Mar. 19, 2019].

* cited by examiner

SPLIT AUTHENTICATION NETWORK SYSTEMS AND METHODS

CROSS-REFERENCE TO RELATED APPLICATIONS

This application is a continuation of U.S. patent application Ser. No. 14/027,188, filed Sep. 14, 2013, now U.S. Pat. No. 9,948,626, which claims priority to U.S. Provisional Patent Application Ser. No. 61/799,909, filed Mar. 15, 2013, both of which are incorporated by reference herein.

TECHNICAL FIELD

The technical field relates to computer systems. More particularly, the technical field relates to computer network systems and methods.

BACKGROUND

When a person desires to bring his or her own device to a network, the person is required to authenticate the device at a network access point to access network resources. Conventionally, this required the person to bring in the device and go through a device enrollment process that authenticates the device and enrolls the device for access to network resources. Usually, a certificate is installed on the device to allow the device to continue to authenticate at the network access point.

The conventional authentication scenario may require commercial certificates or self-signed certificates, which may be unpractical. This scenario may also cause authentication processes to depend on network connection quality. Further, this scenario may cause security problems in the network.

SUMMARY

Disclosed is a system comprising: an authentication datastore; a device presence engine; a traffic monitor engine; an authentication presence monitor engine; an authentication server selection engine; and a traffic routing engine. In operation: the device presence engine is configured to detect presence of a user device on a trusted network; the traffic monitor engine is configured to monitor, in response to the detection, traffic on the trusted network from the device; the authentication presence monitor engine is configured to evaluate onboarding characteristics of the user device in response to the monitoring; the authentication server selection engine is configured to select one of a plurality of authentication servers to authenticate the user device to the trusted network, the selecting based on the onboarding characteristics; and the traffic routing engine is configured to route traffic from the user device to the selected authentication server.

In some embodiments, the onboarding characteristics may comprise an authentication protocol type. The onboarding characteristics may comprise a device type of the user device. The onboarding characteristics may comprise a manufacturer of the user device. The onboarding characteristics may comprise operating system (OS) characteristic of the user device. The onboarding characteristics may comprise operating system (OS) characteristic of the user device. The onboarding characteristics may comprise server capabilities of the system. The onboarding characteristics may comprise hardware characteristics of the user device. The onboarding characteristics may comprise hardware characteristics of the system.

In some embodiments, one of the plurality of authentication servers is configured to support a Protected Extensible Authorization Protocol (PEAP), and another of the plurality of authentication servers is configured to support an Extensible Authorization Protocol Transport Layer Security (EAP-TLS) protocol. In some embodiments, the system may be incorporated into a wireless access point, switch, or router. In some embodiments, the system may be incorporated into a dedicated authentication server.

Disclosed is a method comprising: detecting presence of a user device on a trusted network; monitoring, in response to the detection, traffic on the trusted network from the device; evaluating onboarding characteristics of the user device in response to the monitoring; selecting one of a plurality of authentication servers to authenticate the user device to the trusted network, the selecting based on the onboarding characteristics; and routing traffic from the user device to the selected authentication server.

In some embodiments, the onboarding characteristics may comprise an authentication protocol type. The onboarding characteristics may comprise a device type of the user device. The onboarding characteristics may comprise a manufacturer of the user device. The onboarding characteristics may comprise operating system (OS) characteristic of the user device. The onboarding characteristics may comprise operating system (OS) characteristic of the user device. The onboarding characteristics may comprise server capabilities of the system. The onboarding characteristics may comprise hardware characteristics of the user device. The onboarding characteristics may comprise hardware characteristics of the system. The onboarding characteristics may comprise ownership information relating to the user device, where the ownership can be a relationship between the user and the device. Accordingly, the ownership information can can indicate the user's ownership of the device. For example, the ownership information can include an indication that the user device is issued by and owned by a company that is employing or otherwise associated with the user. In another example, the ownership information can include an indication that the user device belongs to the user himself/herself (e.g., BYOD).

Disclosed is a system comprising: means for detecting presence of a user device on a trusted network; means for monitoring, in response to the detection, traffic on the trusted network from the device; means for evaluating onboarding characteristics of the user device in response to the monitoring; means for selecting one of a plurality of authentication servers to authenticate the user device to the trusted network, the selecting based on the onboarding characteristics; and means for routing traffic from the user device to the selected authentication server.

DETAILED DESCRIPTION

Figure 1:
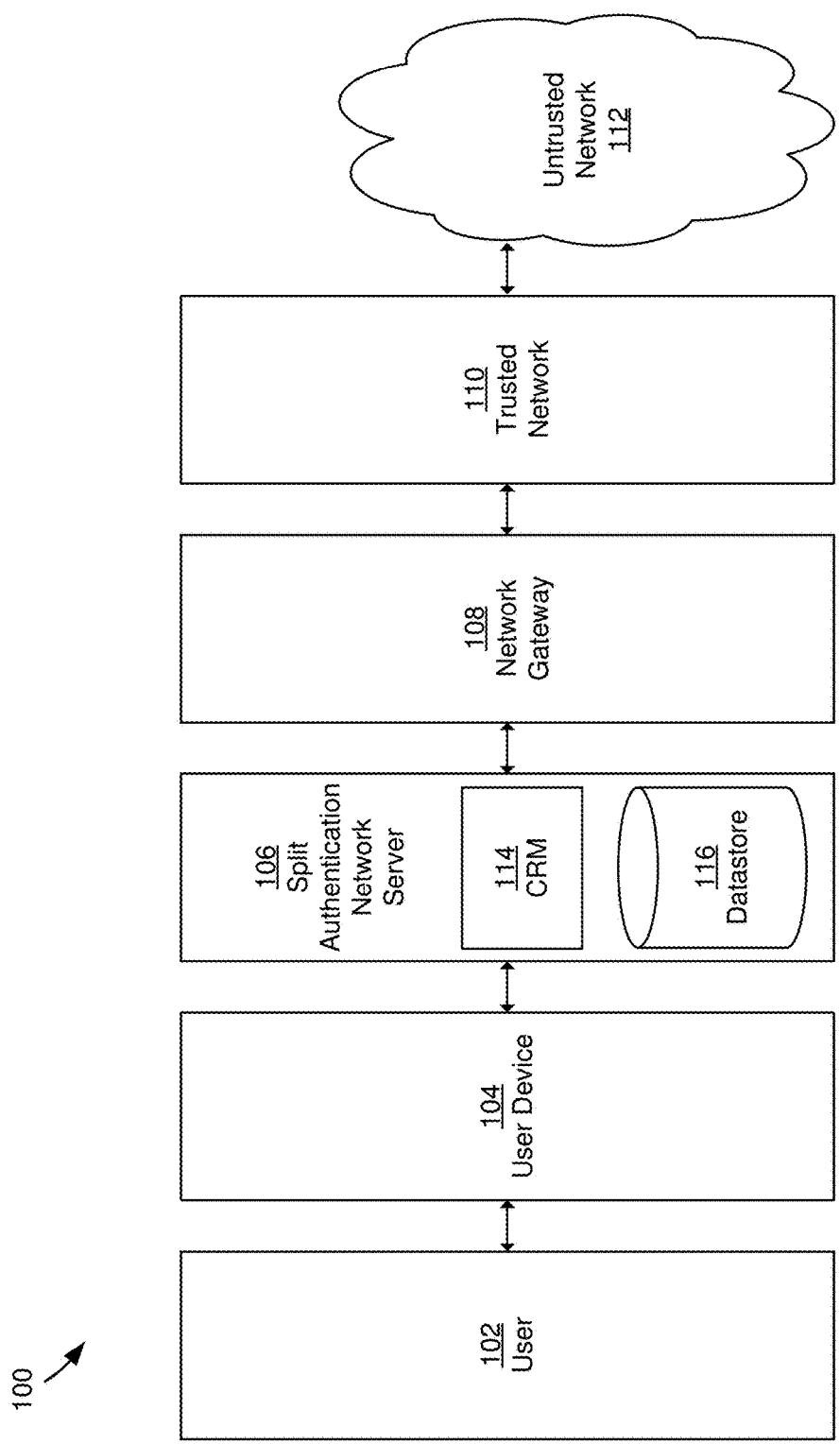
FIG. 1 shows an example of a split authentication network environment.

FIG. 1 shows an example of a split authentication network environment 100. In the example of FIG. 1, the split authentication network environment 100 includes a user 102, a user device 104, a split authentication network system 106, a network gateway 108, a trusted network 110, and an untrusted network 112. As discussed herein, the split authentication network environment 100 can allow the user device 104 to access resources of the trusted network 110 and/or the untrusted network 112 without requiring a device certificate to be installed on the user device 104.

In the example of FIG. 1, the user 102 is intended to represent a person or agent of an owner of the user device 104 trying to connect the user device 104 to the trusted network 110 and/or the untrusted network 112. The user 102 can include, for example, someone who is participating in a Bring Your Own Device (BYOD) scheme. As used herein, a "BYOD" scheme is an arrangement that allows the user 102 to own the user device 104 and to permit the user 102 to bring the user device 104 to access the trusted network 110. The BYOD scheme can allow the user 102 to access trusted resources that are accessible to the trusted network 110. In the BYOD scheme, the entity managing the trusted network 110 need not assign specific devices to the user 102. Rather, the user 102 can arrange for possession of the user device 104 without the entity assigning the user device 104 to the user 102. The BYOD scheme can allow the user 102 flexibility in picking the make, model, manufacture, and configuration of the user device 104. The user 102 is shown associated with the user device 104.

In the example of FIG. 1, the user device 104 is intended to represent a device configured to access the trusted network 110 and/or the untrusted network 112. The user device 104 can comprise a supplicant to the trusted network 110 and/or the untrusted network 112. As used herein, a "supplicant" is an entity at the end of a network segment that seeks to be authenticated by an authenticator of the network segment. As used herein, "authentication" is specifying rights and/or permissions of a particular device to access a resource. The authentication of the user device 104 can be consistent with IEEE 802.1X standards. The 2010 IEEE 802.1X standards, published as IEEE Computer Society, "IEEE Standard for Local and metropolitan area networks—Port-Based Network Access Control," (N.Y. 2010) (hereinafter referred to as the IEEE 802.1X Specification), are hereby incorporated by reference herein.

In a specific implementation, the user device 104 includes a memory and a processor. The user device 104 can be configured similarly to a digital device 700, shown in FIG. 7. The user device 104 can include an operating system (OS) and/or one or more applications. The OS can include hardware and/or software to manage the hardware of the user device 104 and provide services for applications on the user device 104. Examples of OSs running on the user device 104 can include Android OSs, BSD, iOS, Linux, Mac OS X, Microsoft Windows, Windows Phone, and z/OS. The OS and/or applications on the user device 104 can manage access to one or more of the trusted network 110 and the untrusted network 112. The applications on the user device 104 can include application software which helps the user device 104 perform tasks beyond the operation of the user device 104.

In a specific implementation, the OS and/or the applications on the user device 104 provide or facilitate providing network access for the user device 104. For instance, the OS and/or applications on the user device 104 can allow the user device 104 to access information not stored on the user device 104. The network access can include access to one or more of the trusted network 110 and the untrusted network 112. The network access can be managed by OS routines, by applications involving interactions with the user 102 (e.g., web browsers, email clients, shared directories accessible over the trusted network 110 and/or the untrusted network 112, etc.), or other components of the user device 104. In some embodiments, aspects of the network access can be managed by the user 102. Some aspects of the network access of the user device 104 can also be managed by an Information Technology (IT) administrator who manages other portions of the trusted network 110 and/or the untrusted network 112. The network address can be managed by security applications that execute on the user device 104.

In specific implementations, the user device 104 includes a desktop computer, a laptop computer, a mobile phone, a mobile phone with data capabilities (e.g., a "Smartphone"), a tablet computing device, or other digital device. Examples of desktop and laptop computers include Macintosh® computers running some version of Mac OS X and Windows® computers manufactured by an Original Equipment Manufacturer (OEM). Examples of mobile phones and tablet computing devices include Android® devices, devices running a version of iOS®, Blackberries®, and other devices. The user device 104 can be a participant in a BYOD scheme. That is, although the user device 104 can have access to the trusted network 110, the possession of the user device 104 can have been arranged for the user 102. The user device 104 need not have been issued to the user 102 by an IT administrator associated with the trusted network 110.

In the example of FIG. 1, the split authentication network system 106 is coupled to the user device 104. In a specific implementation, the split authentication network system 106 determines onboarding characteristics of the user device 104 and chooses a set of authentication servers to serve the onboarding characteristics. As used herein, "onboarding" includes providing a transition of data and content from the user device 104 to the trusted network 110. "Onboarding" a network can include joining the network and being able to receive data from and transmit data to the network. The "onboarding characteristics" of the user device 104 can include properties of the user device 104 and/or properties of the data traffic from the user device 104 that allow the user device 104 to authenticate itself by establishing it has sufficient rights to access resources of the trusted network 110.

In a specific implementation, the split authentication network system 106 provides a network interface for the user device 104. A "network interface," as used herein, includes anything that allows the user device 104 to physically access a medium containing the trusted network 110 and/or the untrusted network 112. As a network interface, the split authentication network system 106 can provide a network access point for the user device 104. The network interface can comprise a wired network interface. A wired network interface is a network interface that uses a physical cable to couple the user device 104 to the resources of the trusted network 110 and/or the untrusted network 112. To this end, the split authentication network system 106 can include a data port that to receive a physical data cable from the user device 104.

In a specific implementation, the network interface of the split authentication network system 106 includes a wireless network interface. A wireless network interface is a network interface that uses a wireless medium (e.g., air) to couple the user device 104 to the resources of the trusted network 110 and/or the untrusted network 112. For example, the split authentication network system 106 can include an antenna configured to transmit/receive data packets to and from the user device 104. In a specific implementation, the wireless network interface of the split authentication network system 106 includes an interface compliant with the Institute of Electrical and Electronics Engineers (IEEE) 802.1 wireless networking standards. The wireless network interface of the split authentication network system 106 can alternatively or in addition include an interface compliant with other wireless networking standards, such as the third generation of mobile phone mobile communication (3G) and the fourth generation of mobile phone mobile communications (4G) technology standards, or a proprietary interface that is not compliant with any standard.

In a specific implementation, the split authentication network system 106 includes authentication engines to authenticate the user device 104 to the trusted network 110 and/or the untrusted network 112. As used herein, an "engine" includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. The term engine can refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term engine can include memory (shared, dedicated, or group) that stores code executed by the processor.

The term code, as used above, can include software, firmware, and/or microcode, and can refer to programs, routines, functions, classes, and/or objects. The term shared, as used above, means that some or all code from multiple engines can be executed using a single (shared) processor. In addition, some or all code from multiple engines can be stored by a single (shared) memory. The term group, as used above, means that some or all code from a single engine can be executed using a group of processors or a group of execution engines. For example, multiple cores and/or multiple threads of a processor can be considered to be execution engines. In various implementations, execution engines can be grouped across a processor, across multiple processors, and across processors in multiple locations, such as multiple servers in a parallel processing arrangement.

In a specific implementation, the split authentication network system 106 defines policies to determine whether a set of users and/or user devices can access the resources of the trusted network 110 and/or the untrusted network 112. Once a policy is defined, the split authentication network system 106 can also determine whether the user 102 and/or the user device 104 have the attributes of a user and/or device that can access the resources delineated by the policies. The split authentication network system 106 can include an authenticator. As used herein, an "authenticator" is an entity that facilitates the authentication of other entities to the trusted network 110. An "authentication server," as used herein, is an entity that provides an authentication service to an authenticator. The authentication service can determine, based on information from the user device 104, whether the user device 104 is authorized to access the resources of the trusted network 110. Although FIG. 1 shows the split authentication network system 106 as a single module, it is noted that the authenticator and the authentication server inside the split authentication network system 106 can but need not be co-located. That is, the authenticator can access the authentication server remotely through a network connection. The authentication server(s) need not be physical servers. The authentication server(s) can be virtualized instance(s) of authentication server(s).

In a specific implementation, an authenticator of the split authentication network system 106 can interface with the user device 104 to determine whether the user device 104 is who it says it is. The authenticator can also interface with the user device 104 to verify the identity or permissions of the user 102. The authentication server of the split authentication network system 106 can include engines configured to serve requests of the authenticator. The authentication engines of the split authentication network system 106 support authentication for devices seeking to access resources of the trusted network 110, a Local Area Network (LAN) associated with the trusted network 110, or a Wide Area Network (WAN) associated with the trusted network 110. The LAN or WAN can be, in some embodiments, an IEEE 802 LAN. The authenticator, the authentication server, and/or authentication engines of the split authentication network system 106 can be compatible with the IEEE 802.1X Specification.

In the example of FIG. 1, the split authentication network system 106 includes a computer-readable medium 114 and a datastore 116. In specific implementations, the computer-readable medium 114 includes a networked system that includes several computer systems coupled together, such as the Internet, or a device for coupling components of a single computer, such as a bus. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. For illustrative purposes, it is assumed the computer-readable medium 114 broadly includes, as understood from relevant context, anything from a minimalist coupling of the components illustrated in the example of FIG. 1, to every component of the Internet and networks coupled to the Internet.

In general, a computer system will include a processor, memory, non-volatile storage, and an interface. A typical computer system will usually include at least a processor, memory, and a device (e.g., a bus) coupling the memory to the processor. The processor can include, for example, a general-purpose central processing unit (CPU), such as a microprocessor, or a special-purpose processor, such as a microcontroller. The memory can include, by way of example but not limitation, random access memory (RAM), such as dynamic RAM (DRAM) and static RAM (SRAM). The memory can be local, remote, or distributed. The term "computer-readable storage medium" is intended to include physical media, such as memory.

A bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it m not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

A bus can also couple the processor to the interface. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device.

In one example of operation, the computer system can be controlled by operating system software that includes a file management system, such as a disk operating system. File management systems are typically stored in non-volatile storage and cause the processor to execute the various acts required by the operating system to input and output data and to store data in the memory, including storing files on the non-volatile storage. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. Another example of operating system software with associated file management system software is VM (or VM/CMS), which refers to a family of IBM virtual machine operating systems used on IBM mainframes System/370, System/390, zSeries, System z, and compatible systems, including the Hercules emulator for personal computers.

Some portions of this paper can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not necessarily inherently related to any particular computer or other apparatus. Various general purpose systems can be used with programs to configure the general purpose systems in a specific manner in accordance with the teachings herein, or it can prove convenient to construct specialized apparatus to perform the methods of some embodiments. The required structure for a variety of these systems will appear from the description below. In addition, the techniques are not described with reference to any particular programming language, and various embodiments can thus be implemented using a variety of programming languages.

In the example of FIG. 1, the split authentication network system 106 includes the datastore 116. A "datastore," as used herein, can be implemented, for example, as software embodied in a physical computer-readable medium on a general- or specific-purpose machine, in firmware, in hardware, in a combination thereof, or in an applicable known or convenient device or system. Datastores described in this paper are intended, if applicable, to include any organization of data, including tables, comma-separated values (CSV) files, traditional databases (e.g., SQL), or other known or convenient organizational formats.

In an example of a system where the datastore 116 is implemented as a database, a database management system (DBMS) can be used to manage the datastore 116. In such a case, the DBMS can be thought of as part of the datastore 116 or as part of the split authentication network system 106, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the datastores described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which can include a hierarchical model, network model, relational model, object model, or some other applicable known or convenient organization. An optimal structure can vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

Figure 8:
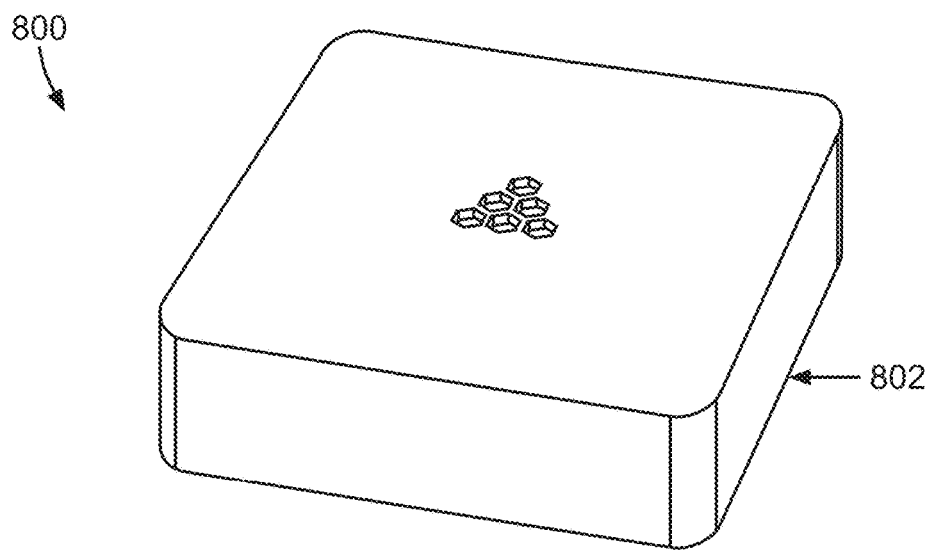
FIG. 8 shows examples of a plurality of network access devices.
Figure 8:
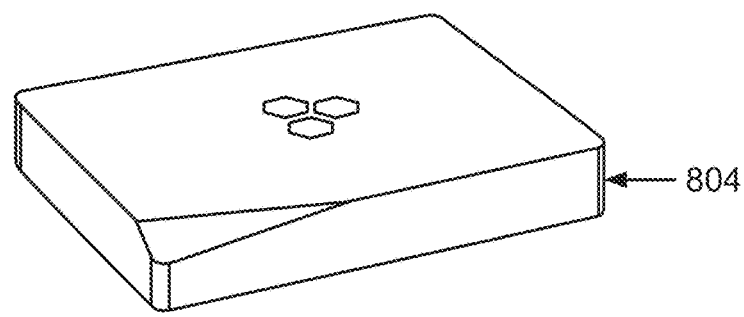
Figure 8:
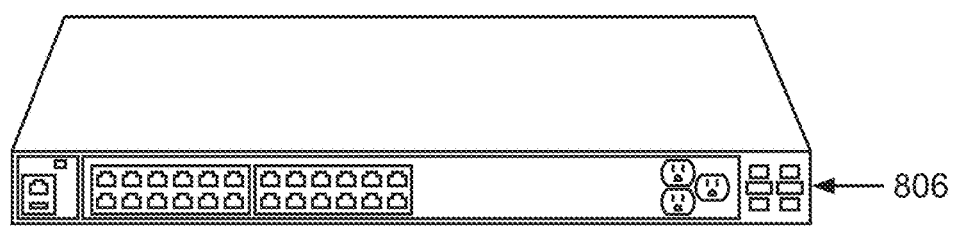

In a specific implementation, the split authentication network system 106 is incorporated into an access point, such as a wired or wireless access point. The split authentication network system 106 can also be implemented, in various embodiments, into a router and/or a switch used to manage portions of the trusted network 110. FIG. 8 shows examples of an access point, a router, and a switch.

In the example of FIG. 1, the network gateway 108 is coupled to the split authentication network system 106. In a specific implementation, the network gateway 108 includes a digital device configured to provide proxy services and act as a firewall on behalf of the trusted network 110. The network gateway 108 can provide access for an IT administrator to administer one or more of the trusted network 110 and portions of the untrusted network 112 that the user device 104 is seeking to access. The network gateway 108 can also allow IT administrators to set policies to access resources associated with the trusted network 110. The network gateway 108 can include one or more of an access point, a router, and a switch, each of which is shown in FIG. 8. Though FIG. 1 shows the split authentication network system 106 separately from the network gateway 108, it is noted that The network gateway 108 can contain portions or all of the split authentication network system 106.

In the example of FIG. 1, the trusted network 110 is coupled to the network gateway 108. In a specific implementation, the trusted network 110 includes a network having trusted resources administered by the network gateway 108. Access to the trusted network 110 can be administered by the split authentication network system 106. As used herein, "trusted resources" are resources that are available to devices able to access the trusted network 110, but unavailable to devices unable to access the trusted network 110. It is noted that a device can be able to access the trusted network 110 without directly being coupled to the trusted network 110, e.g., by establishing a logical or virtual presence on the trusted network 110. The trusted network 110 can include a LAN, a WAN, or a MAN, or portions thereof. The trusted network 110 can include portions of the Internet that contain trusted resources. For instance, the trusted network 110 can include portions of Internet-accessible resources (e.g., cloud-based resources) for which only devices able to access the trusted network 110 are able to access. The trusted network 110 can include a LAN and/or WAN, as defined by the IEEE 802.1X Specification.

In a specific implementation, the trusted network 110 has a geographical component. For example, the trusted network 110 can be limited to a specified geographical locale, such as a hospital, a community, a school, an organization, or a particular office building, for instance. The trusted network 110, in various embodiments, can be managed by a common entity, such as an organization that has multiple locations. For instance, the trusted network 110 can comprise a common network maintained by multiple offices of a specific organization, such as a corporation. The trusted network 110 can be limited to a class of devices seeking to access a trusted resource. For example, the trusted network 110 can include a network of iPhones trying to access a resource available only to iPhones. As another example, the trusted network 110 can be limited to a class of devices having a common processing power and/or a common network capability.

In the example of FIG. 1, the untrusted network 112 is coupled to the trusted network 110. In a specific implementation, the untrusted network includes a network having resources that are not trusted resources (i.e., are not within the trusted network 110). The untrusted network 112 can include the Internet. Access to the untrusted network 112 may or may not be administered by the network gateway 108 and/or the split authentication network system 106. For instance, the network gateway 108 may or may not maintain a firewall limiting access to portions of the untrusted network 112. The split authentication network system 106 also may or may not allow the user device 104 to access portions of the trusted network 110. Although FIG. 1 shows the trusted network 110 as coupled to the trusted network 110, in various embodiments, access to the trusted network 110 can be granted or denied independently of access to the trusted network 110.

Figure 2:
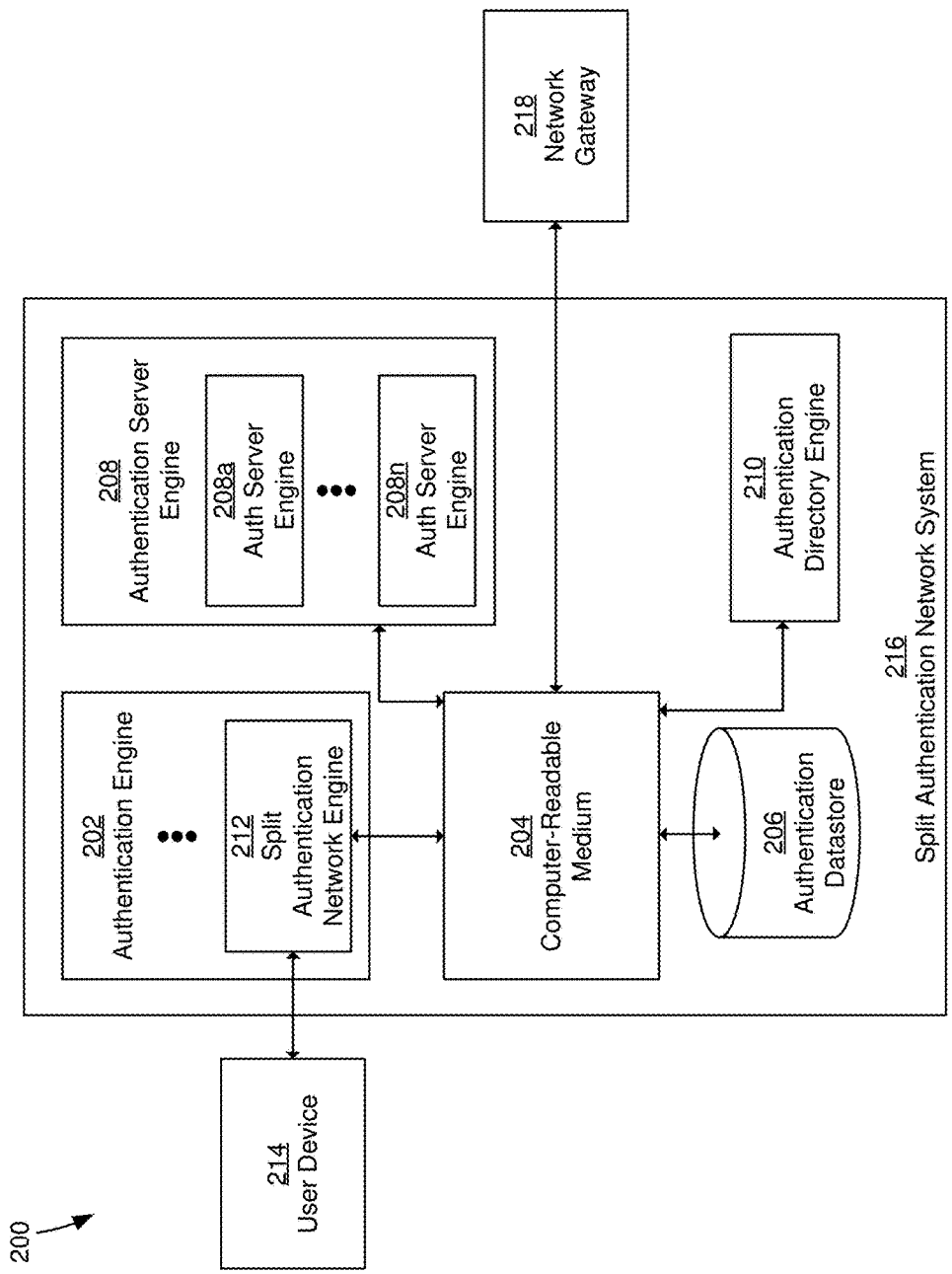
FIG. 2 shows an example of a split authentication network environment.

FIG. 2 shows an example of a split authentication network environment 200. The split authentication network environment 200 includes a user device 202, a split authentication network system 204, and a network gateway 206. In a specific implementation, the user device 202 includes a digital device configured to access a trusted network (see, e.g., FIG. 1, trusted network 110) and/or an untrusted network (see, e.g., FIG. 1, untrusted network 112). The user device 202 and the network gateway 206 can be implemented in a manner similar to the user device 104 and the network gateway 108, described above with reference to FIG. 1.

In the example of FIG. 2, the split authentication network system 204 includes a computer-readable medium 208, an authentication engine 210, an authentication datastore 212, authentication server engines 214-1 to 214-n (collectively referred to as the authentication server engine 214), and an authentication directory engine 216.

In the example of FIG. 2, the computer-readable medium 208 is coupled to the authentication engine 210, the authentication datastore 212, the authentication server engine 214, and the authentication directory engine 216. In specific implementations, the computer-readable medium 208 includes any applicable computer readable medium. The computer-readable medium 208 can couple the various components of the split authentication network system 204 on one or more digital devices. The computer-readable medium 208 can couple the various components of the split authentication network system 204 across one or more network connections.

In a specific implementation, the authentication engine 210 includes engines configured to act as an authenticator of the user device 202 to a trusted network. The authentication engine 210 can operate using an authentication protocol. For example, the authentication engine 210 can be configured to operate using an Extensible Authentication Protocol (EAP), such as EAP Transport Layer Security (EAP-TLS) and/or Protected EAP (PEAP), or other EAP protocol. As an authenticator, the authentication engine 210 can be configured to receive traffic, including network access requests from the user device 202. The authentication engine 210 can further be configured to provide receive EAP Requests, EAP identities, and other information from the user device 202. The authentication engine 210 can also be configured to provide the authentication server engine 214 with the traffic and the network access requests from the user device 202.

In the example of FIG. 2, the authentication engine 210 includes the split authentication network engine 218. In a specific implementation, the split authentication network engine 218 is configured to determine onboarding characteristics of the user device 202, and choose one of a plurality of authentication servers (e.g., one of the authentication server engines 214-1 through 214-n) based on the determined onboarding characteristics. Onboarding characteristics can include one or more of the authentication protocol type, the device type, the capabilities of the authentication server engine 214, the type of EAP requests made by the user device 202, and the stage of the authentication process of the user device 202. The split authentication network engine 218 can also be configured to select one of the authentication server engines 214-1 to 214-n depending on the onboarding characteristics of the user device 202.

In the example of FIG. 2, the authentication datastore 212 is coupled to the computer-readable medium 208. In a specific implementation, the authentication datastore 212 stores authentication information, including onboarding information, relating to the user device 202. The authentication datastore 212 can store device profiles relating to the configuration of the device. For example, the authentication datastore 212 can store how the user device 202 has been authenticated for network access previously. The authentication datastore 212 can also contain user profiles, such as how a particular user has authenticated to a trusted network and/or an untrusted network previously. For instance, the authentication datastore 212 can store a username and a password for each user on the system. The authentication datastore 212 can also store permissions associated with one or more of the authentication server engines 214-1 to 214-n.

In the example of FIG. 2, the authentication server engine 214 is intended to represent an authentication server. In a specific implementation, the authentication server engine 214 provides services to facilitate authentication of the user device 202 to a trusted network and/or an untrusted network. The authentication server engine 214 can implement Remote Authentication Dial In User Service (RADIUS) protocols. As a result, the authentication server engine 214 can provide services to authenticate the user device 202 to a trusted network and/or an untrusted network, authorize access of the user device 202 (or a user thereof) to resources of the trusted network and/or the untrusted network, and/or to account for usage of these services.

In the example of FIG. 2, the authentication server engine 214 includes a plurality of authentication server engines 214-1 to 214-n. In some embodiments, each of the plurality of authentication server engines 214-1 to 214-n could be associated with a different authentication protocol. For example, in various embodiments, one or more of each of the plurality of authentication server engines 214-1 to 214-n can provide services according to the following authentication protocols: PEAP, EAP-TLS, Lightweight Extensible Authentication Protocol (LEAP), EAP-MDS, EAP Protected One-Time Password (POTP), EAP Pre-Shared Key (PSK), EAP-PWD, EAP Tunneled (TLS), EAP Internet Key Exchange (IKE), EAP Flexible Authentication via Secure Tunneling (FAST), EAP Subscriber Identity Module (SIM), EAP Authentication and Key Agreement (AKA), EAP Generic Token Card (GTC), EAP Encrypted Key Exchange (EKE), and so on. In some embodiments, a particular one of the plurality of authentication server engines 214-1 to 214-n can be chosen by the split authentication network engine 204 depending on the onboarding characteristics of the user device 202.

In the example of FIG. 2, the authentication directory engine 216 is coupled to the computer-readable medium 208. In a specific implementation, the authentication directory engine 216 stores, organizes, and provides information of the user device 202, the authentication engine 210, and/or each of the plurality of authentication server engines 214-1 to 214-n. The authentication directory engine 216 can comprise one or more engines to implement an Active Directory® service.

Figure 3:
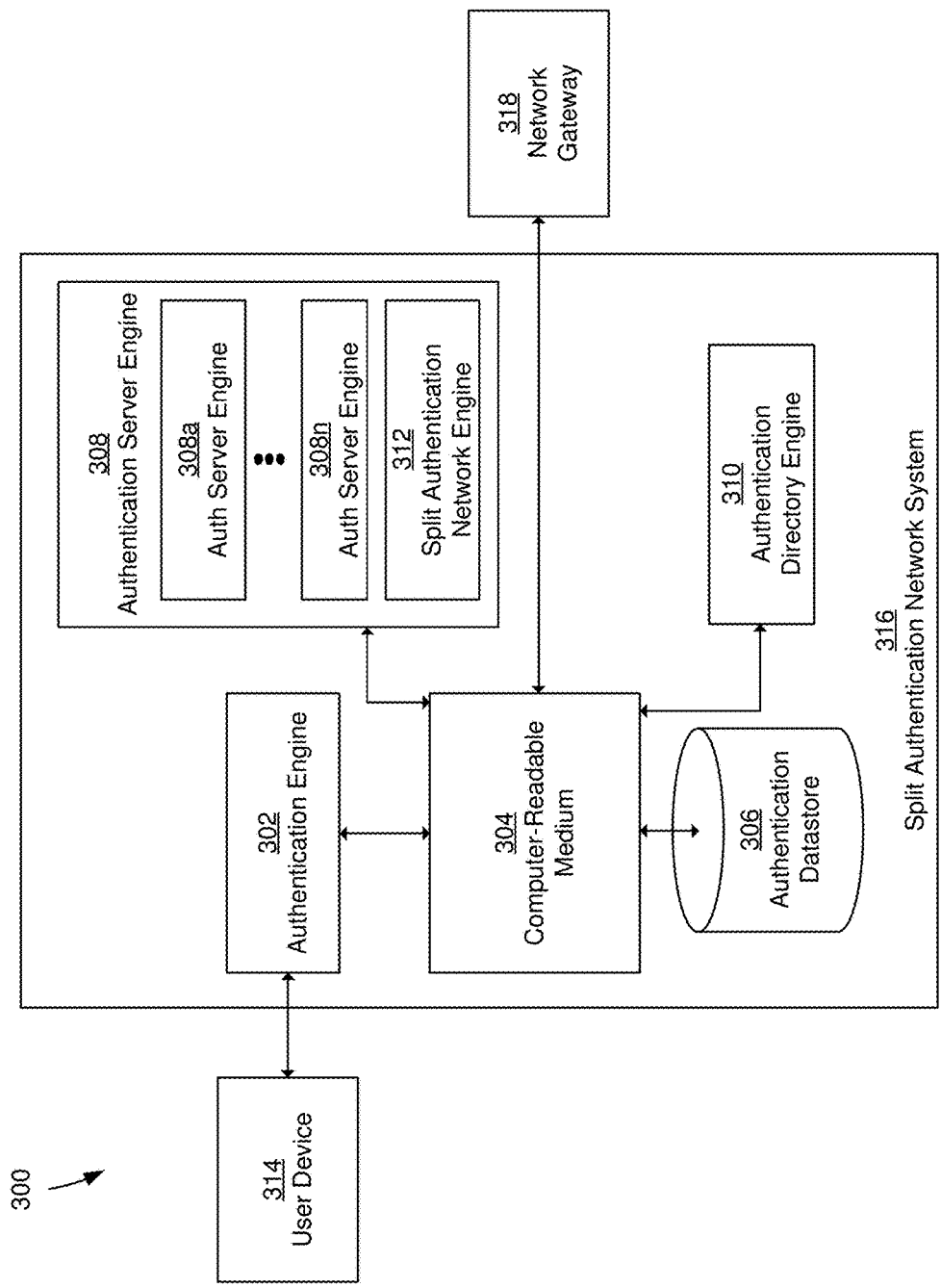
FIG. 3 shows an example of a split authentication network environment.

FIG. 3 shows an example of a split authentication network environment 300. The split authentication network environment 300 includes a user device 302, a split authentication network system 304, and a network gateway 306. The user device 302 can be implemented in a manner similar to that of the user device 104 (see, e.g., FIG. 1). In the example of FIG. 3, the split authentication network system 304 includes a computer-readable medium 308, an authentication engine 310, an authentication datastore 312, an authentication server engine 314, and an authentication directory engine 316. The split authentication network system 304 can be implemented in a manner similar to that of the split authentication network system 204 (see, e.g., FIG. 2), but in the split authentication network system 304, the split authentication network engine 320 is located inside the authentication server engine 314, which includes authentication server sub-engine 318-1 to 318-n.

Figure 4:
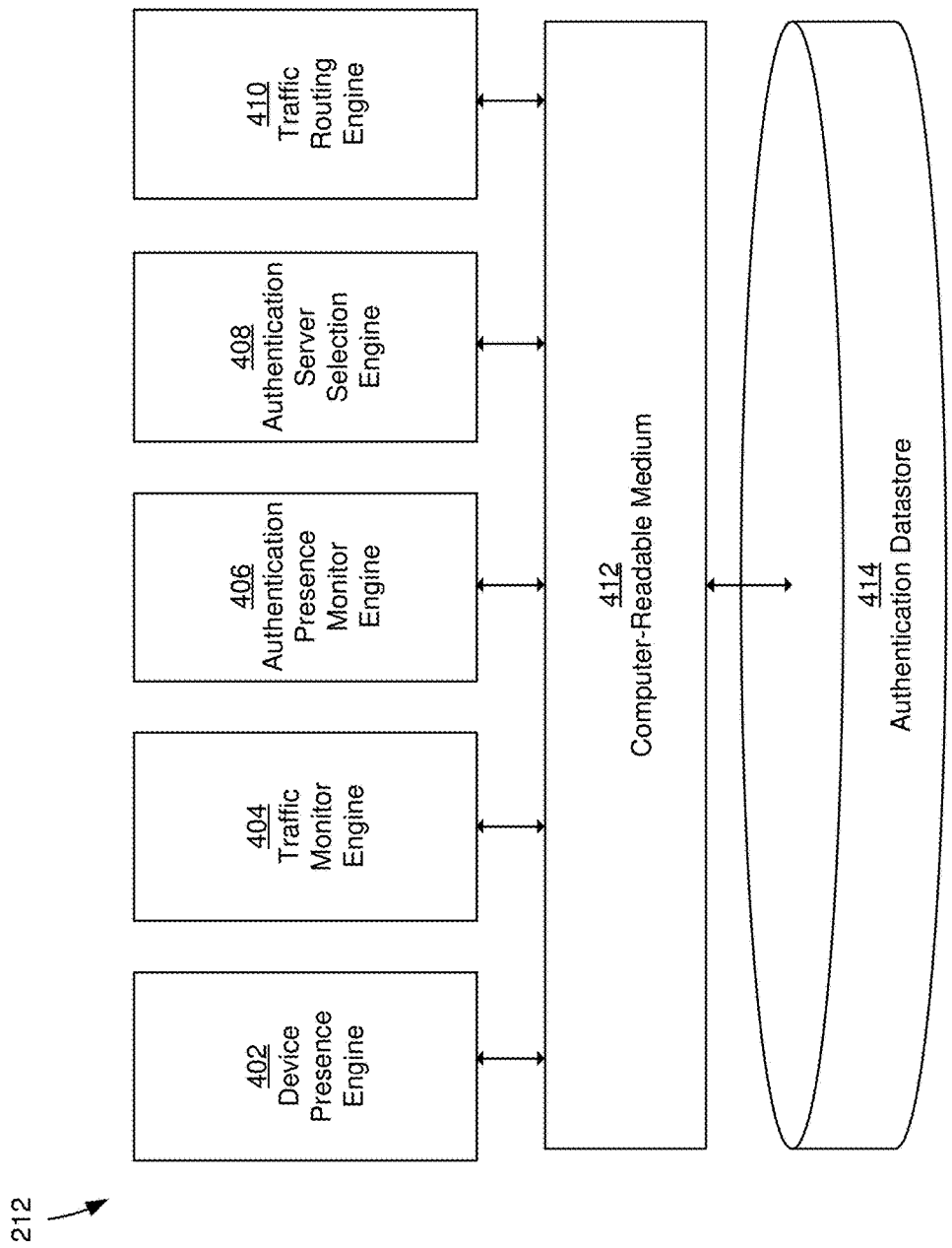
FIG. 4 shows an example of a split authentication network system.

FIG. 4 shows an example of a split authentication network engine 400. In the example of FIG. 4, the split authentication network engine 400 includes a computer-readable medium 402 coupled to a device presence engine 404, a traffic monitor engine 406, an authentication presence monitor engine 408, an authentication server selection engine 410, a traffic routing engine 412, and an authentication datastore 414.

In the example of FIG. 4, the device presence engine 404 is coupled to the computer-readable medium 402. In a specific implementation, the device presence engine is configured to access a list of devices that are authenticated for access to a trusted network, and to determine whether a particular device is attempting to authenticate to the trusted network. The device presence engine 404 can receive an authentication request from a user device. The authentication request can indicate that the user device seeks access to resources of a trusted network but is not currently connected to the trusted network. The authentication request can be consistent with EAP protocols and/or 802.1X standards. The device presence engine 404 can indicate user device presence to the other engines of the split authentication network engine 400.

In the example of FIG. 4, the traffic monitor engine 406 is coupled to the computer-readable medium 402. In a specific implementation, the traffic monitor engine 406, in response to a detected user device presence, monitors traffic relating to the user device and/or an authentication server engine. The traffic monitor engine 406 can incorporate a network analyzer to analyze the contents of all data packets coming into the split authentication network system 400 from the user device. The network analyzer can comprise a packet sniffer or other network analyzer. In some embodiments, the traffic monitor engine 406 further monitors information in each data packet such as device identification information and onboarding characteristic information. The traffic monitor engine 406 can be coupled to the other engines of the split authentication network engine 400 to provide information inside each data packet.

In the example of FIG. 4, the authentication presence monitor engine 408 is coupled to the computer-readable medium 402. In a specific implementation, the authentication presence monitor engine 408 extracts device identifier information and/or onboarding characteristics from the data packets monitored by the traffic monitor engine 406. The device identifier can comprise a media access control (MAC) address of the user device.

In a specific implementation, the onboarding characteristics extracted by the authentication presence monitor engine 408 include an authentication protocol type. For example, the authentication presence monitor engine 408 can determine whether the user device is seeking to authenticate access to a trusted network via one or more of the following protocols: PEAP, EAP-TLS, LEAP, EAP-MDS, EAP POTP, EAP PSK, EAP-PWD, EAP Tunneled TLS, EAP IKE, EAP FAST, EAP SIM, EAP AKA, EAP GTC, EAP EKE, and so on. Other protocols are possible without departing from the scope and substance of the inventive concepts described herein.

In a specific implementation, the onboarding characteristics extracted by the authentication presence monitor engine 408 include a device type of the user device. For example, the authentication presence monitor engine 408 can obtain whether the user device is a desktop computer, a laptop computer, a tablet computer, or a smartphone. In some embodiments, the authentication presence monitor engine 408 can further obtain the manufacturer of the user device, such as whether the user device is manufactured by Apple® or a Microsoft® OEM.

In a specific implementation, onboarding characteristics extracted by the authentication presence monitor engine 408 include operating system classification. For instance, the authentication presence monitor engine 408 can determine whether the user device is running a mobile operating system, a UNIX-based operating system, an Android-based OS, a Windows-based OS, a Mac OS, iOS, an operating system that can support graphical user interfaces (GUIs), a desktop operating system, or other operating system. The authentication presence monitor engine 408 can determine whether the OS is of a certain version (e.g., iOS 5 and/or a certain version of Honeycomb®), or greater. The authentication presence monitor engine 408 can extract the OS manufacturer. The onboarding characteristics extracted by the authentication presence monitor engine 408 can comprise operating system capabilities. For instance, the authentication presence monitor engine 408 can be able to obtain characteristics of the kernel of the OS, the amount of runtime memory the OS supports, the nature of processes and/or services on the OS, and other information.

In a specific implementation, the onboarding characteristics extracted by the authentication presence monitor engine 408 include application capabilities. For example, the authentication presence monitor engine 408 can be able to determine whether the user device has one or more predetermined applications installed on it. One way to obtain this information is if one of the predetermined applications is requesting the authentication. The onboarding characteristics extracted by the authentication presence monitor engine 408 can comprise a user type. The authentication presence monitor engine 408 can be configured to determine, e.g., based on a username and/or password, whether a user is a registered member of an enterprise (e.g., a corporation) administering a trusted network. Such a determination can also be possible based on determining other identifying information about the user of the user device. The onboarding characteristics extracted by the authentication presence monitor engine 408 can comprise a user location. The authentication presence monitor engine 408 can determine whether the user device is located at a particular location in relation to a trusted network.

In a specific implementation, the onboarding characteristics extracted by the authentication presence monitor engine 408 include device capabilities. Extracted device capabilities can include processor and/or memory capabilities of the user device. The device capabilities can further include whether the user device is seeking wired or wireless network connectivity, the network connection speed of hardware on the user device, whether the user device can access streaming applications and/or streaming multimedia, and/or whether the user device has access to particular items of digital right controlled media.

In a specific implementation, the onboarding characteristics extracted by the authentication presence monitor engine 408 include server capabilities of an authentication server engine (see, e.g., FIG. 2, authentication server engine 214). For example, the onboarding characteristics can include an indicator of how the plurality of authentication server engines are configured, and whether one or more of the plurality of authentication server engines can meet the authentication requests of a user device. The onboarding characteristics extracted by the authentication presence monitor engine 408 can comprise network capabilities. The onboarding characteristics extracted by the authentication presence monitor engine 408 can also comprise the hardware characteristics of the device containing the split authentication network system 400, such as whether the split authentication network system 400 is incorporated into an access point, a router, or a switch.

In a specific implementation, the onboarding characteristics extracted by the authentication presence monitor engine 408 can comprise the ownership information from the user's device. The ownership can be a relationship between the user and the device. One user can have different ownerships to different devices, and a given device can be associated with different users with different ownerships. For instance, a given iPad can be shared among employees and contractors, and different ownerships can be associated with the iPad to distinguish such relationships. The authentication server selection engine can use the ownership information to decide which authentication server(s) to use. In some embodiments, the admin can setup a dedicated authentication server for Company Issued Device and another dedicated authentication server for BYOD.

In the example of FIG. 4, the authentication server selection engine 410 is coupled to the computer-readable medium 402. In a specific implementation, the authentication server selection engine 410 selects one of a plurality of authentication server engines based on onboarding characteristics of a user device. The authentication server selection engine 410 can dynamically evaluate the information extracted by the authentication presence monitor engine 408 to match onboarding characteristics with specific configured authentication servers. For example, an authentication request from an iPhone® having an iOS version 4 or below can support a username and a password but may not support other authentication capabilities. If such a lower version iPhone® made an authentication request, the authentication server selection engine 410 can redirect the authentication request to one of the plurality of authentication server engines that can handle the request. As another example, an authentication request from an iPhone® having an iOS version 5 or above can support authentication capabilities well beyond a username and password. Such a request can support access to trusted resources of a trusted network. If such a higher version iPhone® were to make such a request, the authentication server selection engine 410 can redirect the authentication request to one of the plurality of authentication server engines that can handle the request. The authentication server selection engine 410 can also match onboarding characteristics with specific configured authentication servers based on a static set of rules stored in the authentication datastore 414. To find a specific authentication server, the authentication server selection engine 410 can query an authentication directory engine to obtain configurations of which of the plurality of authentication server engines are active.

In the example of FIG. 4, the traffic routing engine 412 is coupled to the computer-readable medium 402. In a specific implementation, the traffic routing engine 412 routes traffic from a user device to a selected one of the plurality of authentication server engines. The traffic routing engine 412 can incorporate redirection engines to reroute the data packets from the user device to a specified one of the plurality of authentication server engines.

Figure 5:
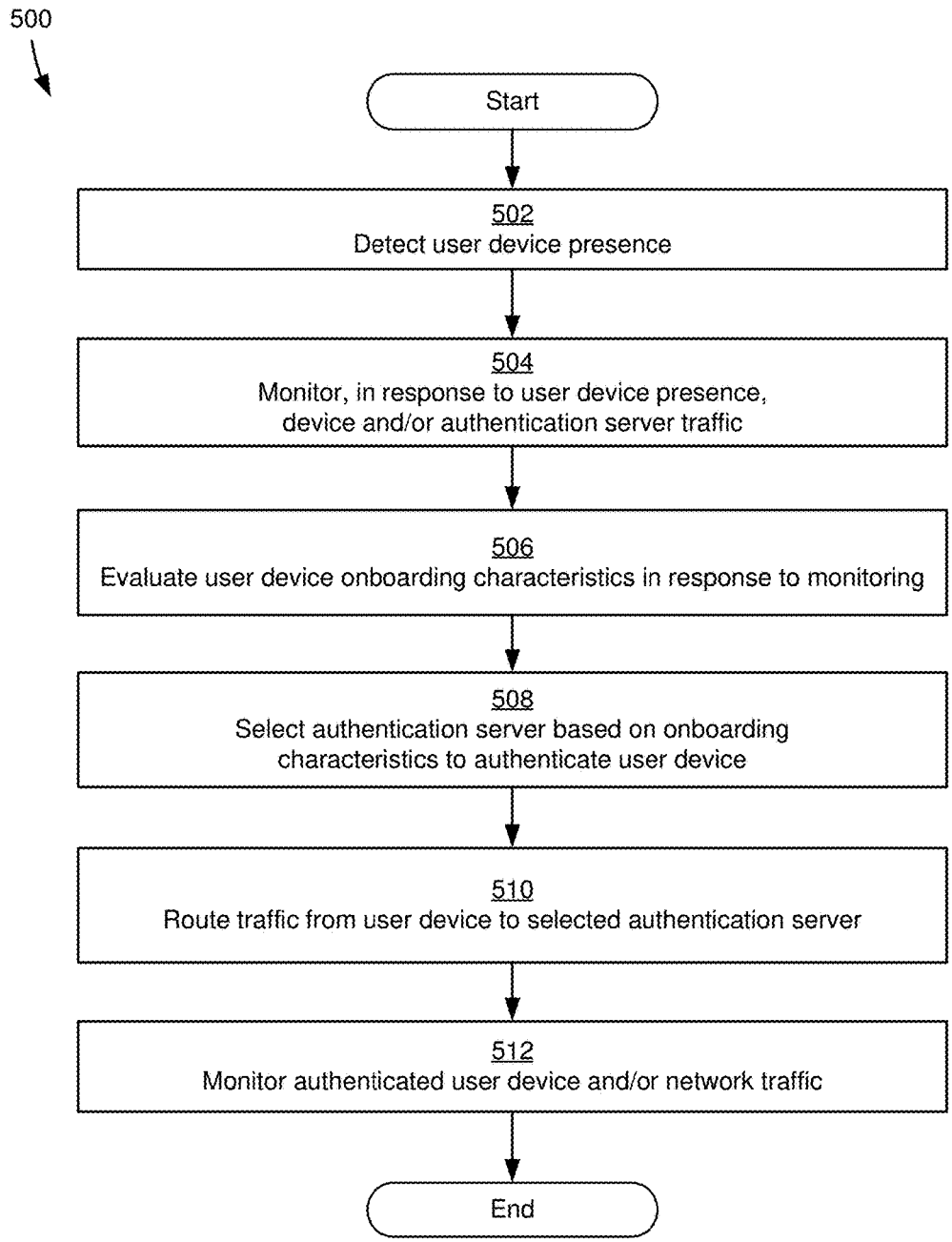
FIG. 5 shows an example of a flowchart of a method for performing split authentication network onboarding.

FIG. 5 shows an example of a flowchart 500 of a method for performing split authentication network onboarding. The flowchart 500 will be discussed in conjunction with the structures shown in FIGS. 1-4. The flowchart 500 can have additional steps or sub-steps and need not include all the steps shown to encompass the inventive concepts described herein.

In the example of FIG. 5, the flowchart 500 starts at module 502 where a device presence engine detects a device presence of a user device. The device presence engine can provide an indication to a traffic monitor engine that the user device has been detected and seeks network authentication.

In the example of FIG. 5, the flowchart 500 continues to module 504, where the traffic monitor engine monitors, in response to the device presence, traffic from the user device and/or an authentication server engine. The traffic monitor engine can implement network analysis techniques to provide the contents of data packets from the user device and/or the authentication server engine to an authentication presence monitor engine.

In the example of FIG. 5, the flowhart 500 continues to module 506, where the authentication presence monitor engine evaluates the onboarding characteristics of the user device in response to the monitoring. The onboarding characters can include one or more of: an authentication protocol type, a device type of the user device, the manufacturer of the user device, an operating system classification of the user device, whether the OS of the user device is of a certain version, the OS manufacturer of the OS of the user device, OS capabilities of the user device, application capabilities of the user device, a user type of the user device, the location of the user device, device capabilities of the user device, server capabilities of the authentication server engine, and other onboarding characteristics. The authentication presence monitor engine can provide the onboarding characteristics to the authentication server selection engine.

In the example of FIG. 5, the flowchart 500 continues to module 508, where the authentication server selection engine selects an authentication server based on the onboarding characteristics to authenticate the user device. The authentication server selection engine matches the user device to one of a plurality of authentication server engines to authenticate the user device. The authentication server selection engine can provide the identity of the selected authorization server to a traffic routing engine.

In the example of FIG. 5, the flowchart 500 continues to module 510, where the traffic routing engine can route the traffic from the user device to the selected authentication server. In the example of FIG. 5, the flowchart 500 ends at module 512, where the traffic monitor engine continues to monitor the authenticated user device and/or the network traffic.

Figure 6:
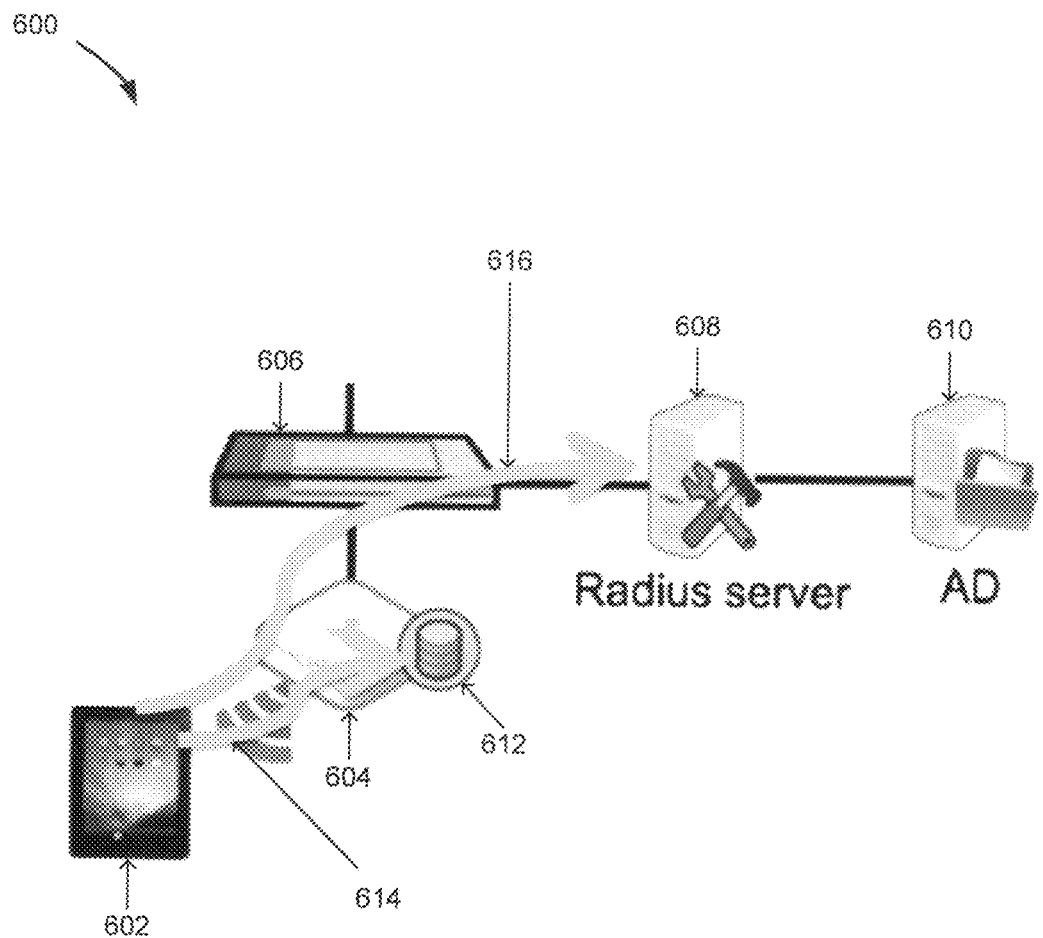
FIG. 6 shows an example of a split authentication network system.

FIG. 6 shows an example of a split authentication network system 600. In the example of FIG. 6, the split authentication network system 600 includes a user device 602, an access point 604, a switch 606, a first authentication server 608, an active directory 610, a second authentication server 612, a first authentication path 614, and a second authentication path 616. In a specific implementation, the split authentication network system 600 incorporates 802.1X authentication protocols.

In the example of FIG. 6, the user device 602 is intended to represent an applicable known or convenient device. For example, the user device 602 can include an iPad® seeking 802.1X authentication to the split authentication network system 600. In a specific implementation, the user device 602 includes a processor, memory, and other components, such as an antenna, to couple the user device 602 to the access point 604. In this example, the antenna can allow the user device 602 to communicate with the access point 604. The data packets can include device identification information and onboarding characteristics of the user device 602.

In a specific implementation, the access point 604 allows the user device 602 access to a trusted network and/or an untrusted network. The access point 604 can contain components, e.g. an antenna, to communicate with the user device 602. The access point 604 can be similar to the access point 802, shown in FIG. 8. In the example of FIG. 6, the access point 604 includes the second authentication server 612. In this example, the second authentication server 612 can be configured to authenticate the user device 602 using an EAP-TLS protocol.

In the example of FIG. 6, the switch 606 is illustrated as linking portions of the split authentication network system 600 to one another. The switch 606 can comprise a bridge architecture or some other applicable convenient architecture. As shown, the switch 606 can couple the access point 604 to the first authentication server 608.

The first authentication server 608 can be configured to provide authentication services to the user device 602. In this example, the first authentication server 608 can provide PEAP protocols for authentication. The first authentication server 608 can comprise a RADIUS server. The active directory 610 can contain a listing of one or more of the devices, including the authentication servers, active on the network. In this example, the active directory 610 can provide a listing that the first authentication server 608 is active and supports a PEAP protocol. The active directory 610 can also provide a listing that the second authentication server 612 is active and supports an EAP-TLS protocol. The first authentication server 608 can include an existing RADIUS server that a company has used to implement a portion of its trusted network. The existing RADIUS server may comprise a dedicated authentication server.

In the example of FIG. 6, a split authentication network engine (see, e.g., FIG. 2) can be incorporated within one or more of the access point 604, the switch 606, and the first authentication server 608. The split authentication network engine can be configured to determine onboarding characteristics of the user device 602 and to choose one or more of the first authentication server 608 and the second authentication server 612 based on the determined onboarding characteristics. For instance, the split authentication network engine 212 can obtain onboarding characteristics of the user device 602, and may: (a) redirect PEAP requests to the first authentication server 608 and (b) redirect EAP-TLS requests to the second authentication server 612. In a specific implementation, the split authentication network engine does not require reconfiguration of the first authentication server 608 for onboarding the user device 602.

In at least one embodiment, the split authentication network engine can be implemented in the access point 604. In at least one embodiment, the split authentication network engine can be implemented in the first authentication server 608 (e.g., by RADIUS server functionalities). The split authentication network system 600 can present at least several advantages. First, the split authentication network system 600 can be flexible. That is, the split authentication network system 600 can allow IT administrators to decide which authentication server is the best choice for each onboarding scenario for the user device 602. Second, the split authentication network system 600 can make authentication simple. Instead of making one authentication server very complicated, IT administrators can keep each authentication server simple and purpose-built. The split authentication network system 600 can provide a centralized interface for IT administrators to manage multiple instances. Third, the split authentication network system 600 can be secure. Since each authentication server is dedicated, it gives IT administrators more control and visibility. Users can be redirected to different instances and apply different policies. Such security enforcement option is impossible with one single giant authentication server. Fourth, the split authentication network system 600 can provide better performance. Different authentication server instances can be deployed in different places to maximize performance. For instance, when the EAP-TLS Radius server is deployed on the AP, it will help improve the authentication as well as roaming performance. Fifth, the split authentication network system 600 can provide a lower cost. Using example above, the company's existing Radius server for 802.1X PEAP authentication can have a commercial server certificate while the Radius server on the access point for the EAP-TLS authentication can use the self-signed certificates.

Figure 7:
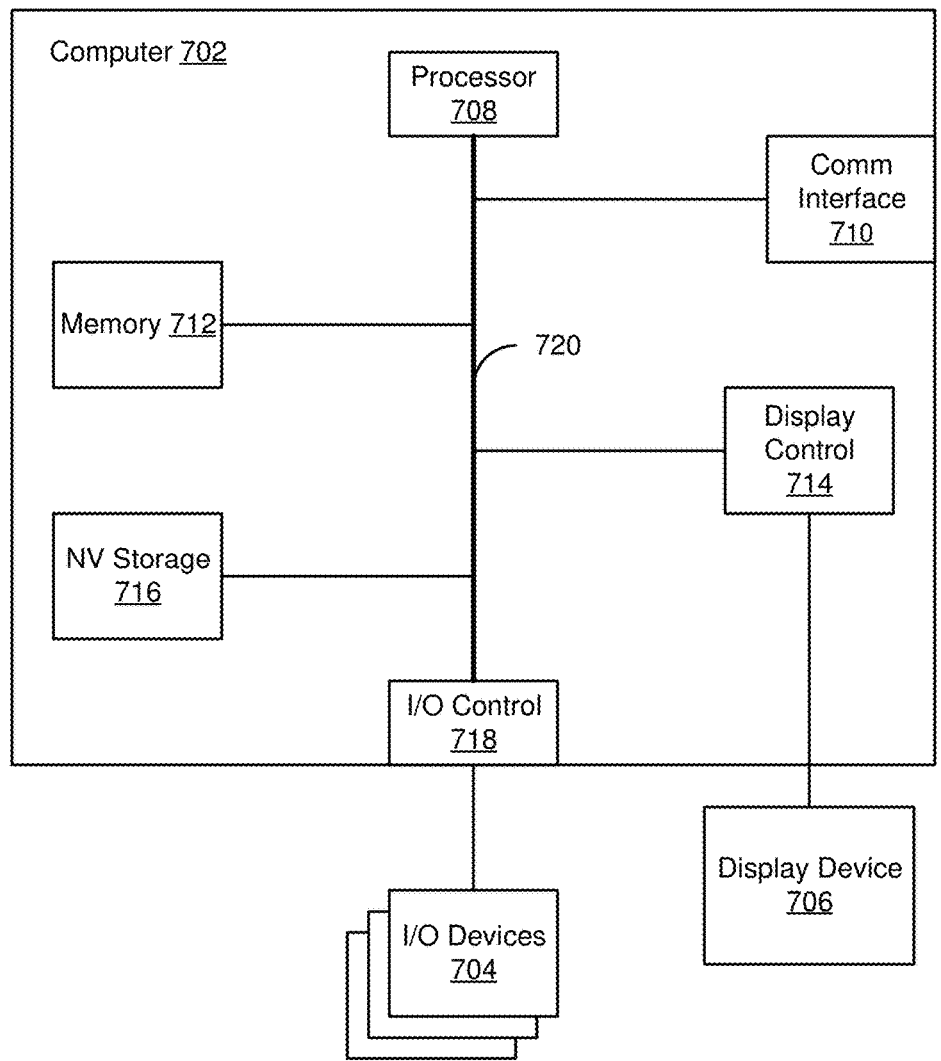
FIG. 7 shows an example of a digital device.

FIG. 7 shows an example of a digital device 700. In the example of FIG. 7, the digital device 700 can be a conventional computer system that can be used as a client computer system, such as a wireless client or a workstation, or a server computer system. The digital device 700 includes a computer 702, I/O devices 704, and a display device 706. The computer 702 includes a processor 708, a communications interface 710, memory 712, display controller 714, non-volatile storage 716, and I/O controller 718. The computer 702 can be coupled to or include the I/O devices 704 and display device 706.

In the example of FIG. 7, the computer 702 interfaces to external systems through the communications interface 710, which can include a modem or network interface. It will be appreciated that the communications interface 710 can be considered to be part of the digital device 700 or a part of the computer 702. The communications interface 710 can be an analog modem, ISDN modem, cable modem, token ring interface, satellite transmission interface (e.g. "direct PC"), or other interfaces for coupling a computer system to other computer systems.

In the example of FIG. 7, the processor 708 can be, for example, a conventional microprocessor such as an Intel Pentium microprocessor or Motorola power PC microprocessor. The memory 712 is coupled to the processor 708 by a bus 720. The memory 712 can be Dynamic Random Access Memory (DRAM) and can also include Static RAM (SRAM). The bus 720 couples the processor 708 to the memory 712, also to the non-volatile storage 716, to the display controller 714, and to the I/O controller 718.

In the example of FIG. 7, the I/O devices 704 can include a keyboard, disk drives, printers, a scanner, and other input and output devices, including a mouse or other pointing device. The display controller 714 can control in the conventional manner a display on the display device 706, which can be, for example, a cathode ray tube (CRT) or liquid crystal display (LCD). The display controller 714 and the I/O controller 718 can be implemented with conventional well known technology.

In the example of FIG. 7, the non-volatile storage 716 is often a magnetic hard disk, an optical disk, or another form of storage for large amounts of data. Some of this data is often written, by a direct memory access process, into memory 712 during execution of software in the computer 702. One of skill in the art will immediately recognize that the terms "machine-readable medium" or "computer-readable medium" includes any type of storage device that is accessible by the processor 708 and also encompasses a carrier wave that encodes a data signal.

In the example of FIG. 7, the digital device 700 is one example of many possible computer systems which have different architectures. For example, personal computers based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

FIG. 8 shows examples of a plurality of network access devices 800. In the example of FIG. 8, the network access devices 800 can include an access point 802, a router 804, and a switch 806. One or more of the access point 802, the router 804, and the switch 806 can contain at least portions of the systems and modules described herein.

Network computers are another type of computer system that can be used in conjunction with the teachings provided herein. Network computers do not usually include a hard disk or other mass storage, and the executable programs are loaded from a network connection into the memory 712 for execution by the processor 708. A Web TV system, which is known in the art, is also considered to be a computer system, but it can lack some of the features shown in FIG. 7, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program can be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

We claim:

1. A method comprising:
    receiving one or more packets wirelessly transmitted from a user device through a wireless access point to access a trusted network;
    determining a type of an extensible authorization protocol (EAP) associated with the user device based on the one or more packets;
    upon determining that the type of EAP associated with the user device is a first EAP, routing the one or more packets to a first authentication server provided in the trusted network and associated with the first EAP, for authentication of the user device according to the first EAP;
    upon determining that the type of EAP associated with the user device is a second EAP different from the first EAP, routing the one or more packets to a second authentication server provided in the trusted network and associated with the second EAP, for authentication of the user device according to the second EAP;
    wherein the first EAP involves a server certificate and does not involve a self-signed user certificate for authentication, and the second EAP involves a server certificate and a self-signed user certificate for authentication.

2. The method of claim 1, wherein the first authentication server is incorporated in a dedicated authentication server for the trusted network provided in the trusted network separately from the wireless access point, and the second authentication server is incorporated in the wireless access point, and
    the first EAP involves a server certificate and does not involve a self-signed user certificate for authentication, and the second EAP involves a server certificate and a self-signed user certificate for authentication.

3. The method of claim 1, wherein the one or more packets are received by the wireless access point, the EAP associated with the user device is determined by the wireless access point, and the one or more packets are routed by the wireless access point.

4. The method of claim 1, wherein the one or more packets are received by the wireless access point, the EAP associated with the user device is determined by the wireless access point, and the one or more packets are routed by the wireless access point, and
    the first authentication server is incorporated in a dedicated authentication server for the trusted network provided in the trusted network separately from the wireless access point, and the second authentication server is incorporated in the wireless access point.

5. The method of claim 1, wherein the one or more packets are received by a dedicated authentication server for the trusted network provided in the trusted network separately from the wireless access point, the EAP associated with the user device is determined by the dedicated authentication server, and the one or more packets are routed by the dedicated authentication server.

6. The method of claim 1, wherein the one or more packets are received by a dedicated authentication server for the trusted network provided in the trusted network separately from the wireless access point, the EAP associated with the user device is determined by the dedicated authentication server, and the one or more packets are routed by the dedicated authentication server, and
    the first authentication server is incorporated in a dedicated authentication server, and the second authentication server is incorporated in the wireless access point.

7. The method of claim 1, wherein the one or more packets include a media access control (MAC) address of the user device, and the EAP associated with the user device is determined based on the MAC address of the user device.

8. The method of claim 1, wherein the one or more packets include information on an operating system of the user device, and the EAP associated with the user device is determined based on the information on the operating system of the user device.

9. The method of claim 1, further comprising obtaining, from a directory, a listing of authentication servers indicating one or more EAPs supported by the authentication servers, wherein the routing the one or more packets to the first and second authentication server is performed based on the listing.

10. A system comprising: one or more processors;
memory coupled to the one or more processors, the memory configured to store instructions to instruct the one or more processors to perform a computer-implemented method, the computer-implemented method comprising:
receiving one or more packets wirelessly transmitted from a user device through a wireless access point to access a trusted network;
determining a type of an extensible authorization protocol (EAP) associated with the user device based on the one or more packets;
upon determining that the type of EAP associated with the user device is a first EAP, routing the one or more packets to a first authentication server provided in the trusted network and associated with the first EAP, for authentication of the user device according to the first EAP;
upon determining that the type of EAP associated with the user device is a second EAP different from the first EAP, routing the one or more packets to a second authentication server provided in the trusted network and associated with the second EAP, for authentication of the user device according to the second EAP;
wherein the first EAP involves a server certificate and does not involve a self-signed user certificate for authentication, and the second EAP involves a server certificate and a self-signed user certificate for authentication.

11. The system of claim 10, wherein the first authentication server is incorporated in a dedicated authentication server for the trusted network provided in the trusted network separately from the wireless access point, and the second authentication server is incorporated in the wireless access point, and
the first EAP involves a server certificate and does not involve a self-signed user certificate for authentication, and the second EAP involves a server certificate and a self-signed user certificate for authentication.

12. The system of claim 10, wherein the system is incorporated in the wireless access point.

13. The system of claim 10, wherein the system and the second authentication server are incorporated in the wireless access point, and the first authentication server is incorporated in a dedicated authentication server for the trusted network provided in the trusted network separately from the wireless access point.

14. The system of claim 10, wherein the system is incorporated in a dedicated authentication server for the trusted network provided in the trusted network separately from the wireless access point.

15. The system of claim 10, wherein the system and the first authentication server are incorporated in a dedicated authentication server for the trusted network provided in the trusted network separately from the wireless access point, and the second authentication server is incorporated in the wireless access point.

16. The system of claim 10, wherein the one or more packets include a media access control (MAC) address of the user device, and the EAP associated with the user device is determined based on the MAC address of the user device.

17. The system of claim 10, wherein the one or more packets include information on an operating system of the user device, and the EAP associated with the user device is determined based on the information on the operating system of the user device.

18. A method comprising:
receiving one or more packets wirelessly transmitted from a user device through a wireless access point to access a trusted network;
determining a type of an EAP associated with the user device based on the one or more packets;
upon determining that the type of extensible authorization protocol (EAP) associated with the user device is a first EAP, routing the one or more packets to a first authentication server provided in the trusted network and associated with the first EAP, for authentication of the user device according to the first EAP;
upon determining that the type of EAP associated with the user device is a second EAP different from the first EAP, routing the one or more packets to a second authentication server provided in the trusted network and associated with the second EAP, for authentication of the user device according to the second EAP;
wherein the one or more packets include information on an operating system of the user device, and the EAP associated with the user device is determined based on the information on the operating system of the user device.

19. The method of claim 18, wherein the one or more packets are received by the wireless access point, the EAP associated with the user device is determined by the wireless access point, and the one or more packets are routed by the wireless access point.

20. The method of claim 18, wherein the one or more packets include a media access control (MAC) address of the user device, and the EAP associated with the user device is determined based on the MAC address of the user device.

* * * * *